July 24, 1951  M. RASHEVSKY ET AL  2,561,994
SPRING-MOUNTING FOR TURBOGENERATOR STATORS
Filed Dec. 14, 1949  2 Sheets-Sheet 1

Fig. I.

WITNESSES:
Edward Michaels
Mrs. C. Groome

INVENTORS
Michael Rashevsky &
René A. Baudry.
BY O.B.Buchanan
ATTORNEY

July 24, 1951    M. RASHEVSKY ET AL    2,561,994
SPRING-MOUNTING FOR TURBOGENERATOR STATORS
Filed Dec. 14, 1949    2 Sheets-Sheet 2

WITNESSES:
Edward Michaels
Rev. C. Groomes

INVENTORS
Michael Rashevsky &
René A. Baudry.
BY O.B. Buchanan
ATTORNEY

Patented July 24, 1951

2,561,994

UNITED STATES PATENT OFFICE 2,561,994

SPRING MOUNTING FOR TURBO-GENERATOR STATORS

Michael Rashevsky and René A. Baudry, Pittsburgh, Pa., assignors to Westinghouse Electric Corporation, East Pittsburgh, Pa., a corporation of Pennsylvania Application December 14, 1949, Serial No. 132,912

3 Claims. (Cl. 171—252)

Our invention relates to spring-mountings for the stator-cores of turbine generators. It is an improvement over the constructions shown in the Baudry Patent 2,320,843 of June 1, 1943, the Baudry and Criner Patent 2,424,299 of July 22, 1947. Both of these prior patents show horizontal-shaft alternating-current dynamo-electric machines of such size and speed that the double-frequency stator-core vibrations are large enough to necessitate spring-mounting of said core.

An object of our present invention is to provide a new spring-arrangement which reduces the maximum compressive stress in any spring, thus producing a higher factor of safety against buckling.

Another object of our present invention is to provide a novel structural arrangement for securing the two ends of the springs to the core-supporting rings and to the outer frame-rings, respectively.

Figure 1:
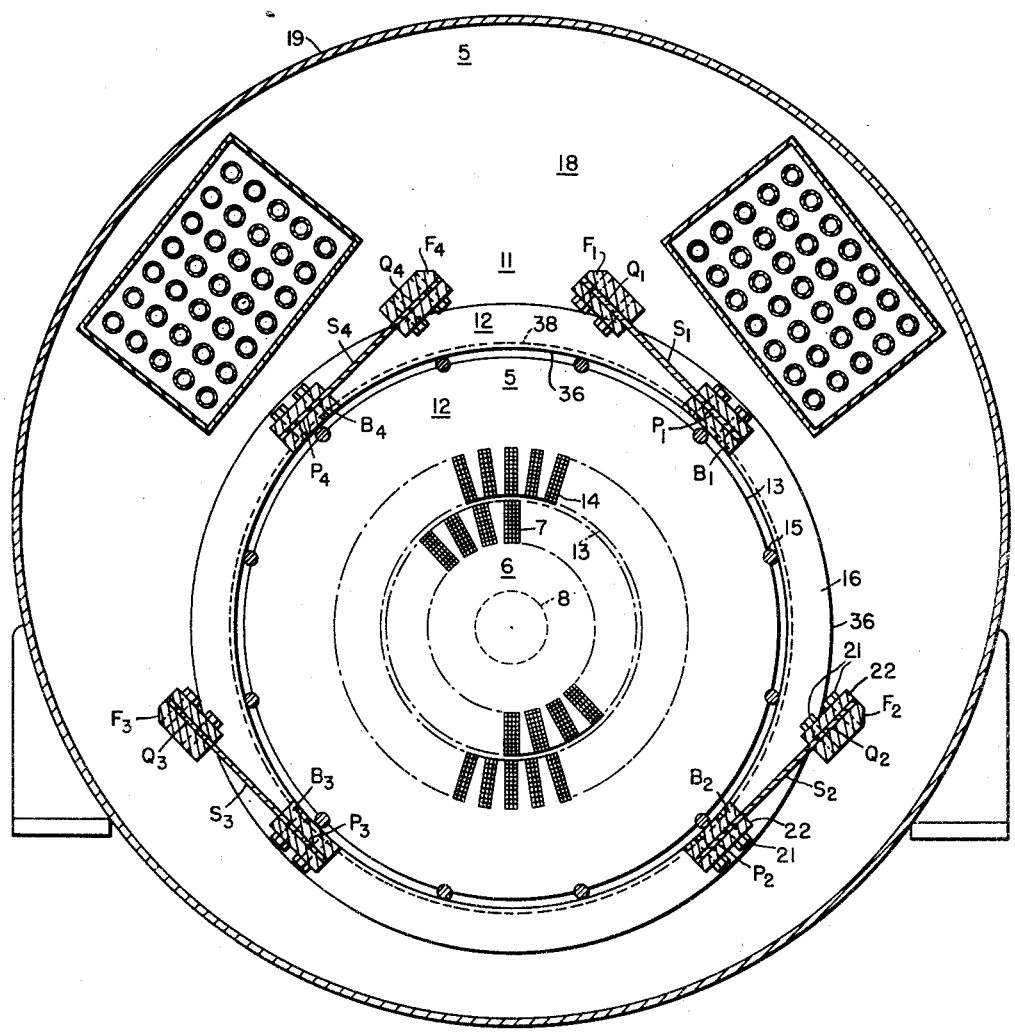
Figure 2:
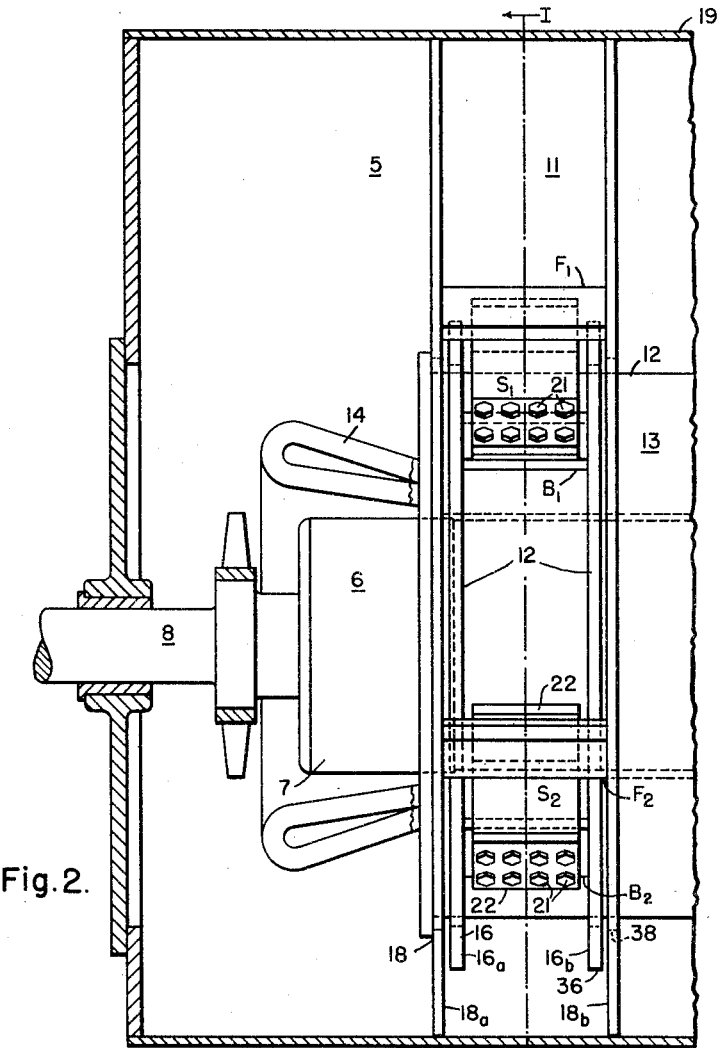
Figures 3, 4:
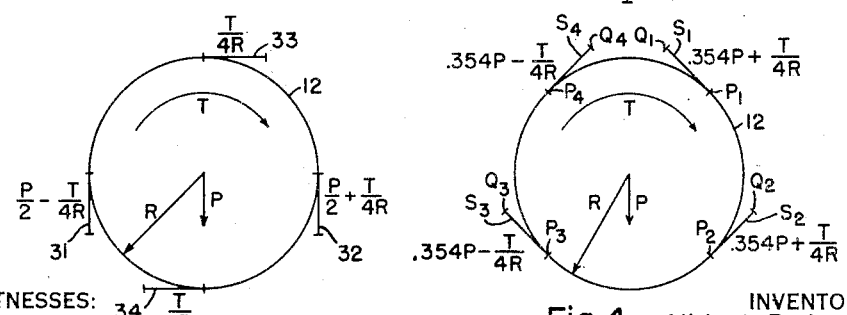

With the foregoing and other objects in view, our invention consists in the machines, structures, combinations, parts and methods of design and operation, hereinafter described and claimed and illustrated in the accompanying drawing, wherein Figure 1 is a transverse sectional view of a machine illustrating our invention, the section-plane being indicated by the line I—I in Fig. 2;

Fig. 2 is a side elevational view of the left half of the machine, with the housing-shell broken away in longitudinal section, so as to expose the frame-construction, and Figs. 3 and 4 are diagrammatic views illustrative of the old and new spring-mounting systems, respectively.

In Figs. 1 and 2, we have shown an embodiment of our invention in an illustrative form of construction of a turbo-generator, which comprises a stator 5 and a rotor 6. The rotor is rotatably supported within the stator. Said rotor comprises a direct-current field-winding 7 and a horizontal shaft 8.

The stator 5 comprises an outer frame 11 and an inner frame 12. The inner frame comprises a stator-core 13 which supports the polyphase windings 14 of the generator. The stator-core 13 is made up of laminations which are stacked on, and interlockingly keyed to, a plurality of longitudinally extending core-supporting rods 15, which are in turn secured to the inner bores of a plurality of core-supporting rings 16, which are disposed at axially spaced points along the length of the stator-core.

The outer frame 11 comprises a plurality of axially spaced frame-rings 18, surrounded by the housing-shell 19 of the machine.

In accordance with our present invention, as illustrated, the weight of the inner frame 12 is tensionally supported from the outer frame 11 by two sets of four broad flat leaf-springs $S_1$, $S_2$, $S_3$ and $S_4$, one set being disposed near each end of the machine. The flat sides of these springs are substantially tangential to the inner frame at the respective points of attachment thereto, as indicated at $P_1$, $P_2$, $P_3$ and $P_4$, and they all extend at an angle of substantially 45° to the vertical. The points of attachment between the several springs and the outer frame are indicated at $Q_1$, $Q_2$, $Q_3$ and $Q_4$, respectively.

A preferred structural formation for fastening the respective ends of the springs to the inner and outer frames 12 and 11 is shown in Fig. 2, wherein the set of springs is shown as being disposed between a pair of core-supporting rings $16_a$ and $16_b$, and between a pair of frame-rings $18_a$ and $18_b$, the frame-rings $18_a$ and $18_b$ being spaced further apart than the corresponding pair of core-supporting rings $16_a$ and $16_b$. In assembling the four broad flat leaf-springs $S_1$, $S_2$, $S_3$ and $S_4$, we preferably first weld four axially extending inner-frame beams $B_1$, $B_2$, $B_3$ and $B_4$ between the pair of core-supporting rings $16_a$ and $16_b$, at the inner-frame points of attachment $P_1$, $P_2$, $P_3$ and $P_4$, respectively. The outer surfaces of these beams are then accurately machined to be flat and substantially tangential to the inner frame, and the lower ends of the respective leaf-springs $S_1$, $S_2$, $S_3$ and $S_4$ are bolted to these inner-frame beams $B_1$, $B_2$, $B_3$ and $B_4$, using bolts 21 which clamp each spring between one of said beams and a clamping-plate 22. The upper ends of the several springs $S_1$, $S_2$, $S_3$ and $S_4$ are similarly secured to four axially extending outer frame beams $F_1$, $F_2$, $F_3$ and $F_4$, which are welded in place or otherwise properly secured between their frame-rings $18_a$ and $18_b$.

The operation and advantages of our invention will best be understood by comparison with the previously used constructions. The spring-arrangement which has previously been used by the Westinghouse Electric Corporation, which is the assignee of the present application, is essentially that which is shown in the Baudry Patent 2,320,843, as diagrammatically indicated in our Fig. 3. In this spring-arrangement, the entire static load or weight of the inner frame is carried by two vertical springs 31 and 32 of each set of four springs. The other two springs 33 and 34 are disposed horizontally, at the top and bottom of the inner frame, respectively, so that the thrust T/R, due to their share (half) of the rotor-torque T, is divided equally between the four springs 31, 32, 33 and 34, the radius of the points of attachment to the inner frame being indicated at R. Designating the static load, or weight, of half of the inner frame, as P, the compressional forces on the four springs 31, 32, 33 and 34 of the prior-art construction are as follows:

$$F_{31} = \frac{P}{2} - \frac{T}{4R}$$

$$F_{32} = \frac{P}{2} + \frac{T}{4R}$$

$$F_{33} = F_{34} = \frac{T}{4R}$$

The spring-arrangement which was shown in the Baudry and Criner Patent 2,424,299 is similar to that which is shown in our Fig. 3, except that the springs are arranged in tension rather than compression. This tensional arrangement, shown in the Baudry and Criner patent, has not been used to any considerable extent, because of the unsymmetrical distribution of the static load on only two of the springs.

While the tension-spring arrangement of the Baudry and Criner patent has not been used, the other essential features of its structural details have been used, to the extent of using core-supporting rings (such as our rings 16) having an outer periphery 36 which is larger than the bore or inner periphery 38 of the frame-rings (corresponding to our rings 18). In this form of construction it is necessary to assemble the inner and outer rings in their proper order, before the core-supporting rods 15 are welded to the respective core-supporting rings 16, and before the housing-shell 19 is welded to the frame-rings 18. Our present structural arrangement, in which a pair of core-supporting rings 16a and 16b are disposed between a pair of corresponding outer-frame-rings 18a and 18b, is new, however, and it is advantageous in enabling us to use extremely broad springs $S_1$, $S_2$, $S_3$ and $S_4$, the breadth of the springs being disposed in an axial direction and affording all of the rigidity against axial displacement, which is needed.

Our new 45° spring-arrangement, with all of the springs sharing the static load or weight P, and in tension rather than compression, is shown in our Fig. 4, by way of comparison with the old arrangement which is shown in our Fig. 3. The tensional stresses on our four springs $S_1$, $S_2$, $S_3$ and $S_4$ are as follows:

$$f_1 = f_2 = .354P + \frac{T}{4R}$$

$$f_3 = f_4 = .354P - \frac{T}{4R}$$

Under normal operating conditions, the torque T is small enough so that all of our springs remain under tension, but under short-circuit conditions, the torque increases some tenfold, more or less, so that two of our springs, namely $S_3$ and $S_4$, in each set of springs, are under a compressive force of $T/(4R) - .354P$. This compressive force, tending to buckle our springs $S_3$ and $S_4$, is considerably smaller, however, than the maximum compression-load which was placed on the spring 32 of the old arrangement of our Fig. 3, wherein the maximum compressive force was $T/(4R) + .5P$. This compressive force is larger than our compressive force by .854P, or over 85% of the half-weight P of the inner frame 12.

We thus have a much greater factor of safety against the possibility of spring-buckling, than in the old Baudry arrangement. At the same time, the static load is equally divided between all four springs of each set, so that we do not impose unwarranted stresses on the outer frame-rings 18a and 18b as a result of anchoring our weight-supporting springs in said frame-rings, so as to use said springs in tension, for supporting the weight P, as distinguished from Baudry's arrangement of anchoring his weight-supporting springs 31 and 32 in the machine-foundation, rather than in the stator frame-rings.

While we have illustrated and described our invention in a preferred form of embodiment, we wish it to be understood that various changes can be made, in the way of substitution of details and equivalents, and by way of the addition or omission of parts. We desire, therefore, that the appended claims shall be accorded the broadest construction consistent with their language.

We claim as our invention:

1. A horizontal-shaft alternating-current dynamo-electric machine having an outer frame, an inner frame, a stator-core secured in the inner frame, and a plurality of sets of four flat leaf-springs for tensionally supporting the weight of the inner frame from the outer frame, the flat sides of said springs being substantially tangential to the inner frame at the respective points of attachment thereto, and extending at an angle of substantially 45° to the vertical, and said machine being of such size and speed that the double-frequency stator-core vibrations are large enough to necessitate spring-mounting of said core.

2. The invention as defined in claim 1, characterized by said inner frame comprising a plurality of externally projecting core-supporting rings, and said outer frame comprising a plurality of internally projecting frame-rings, each set of four leaf-springs being disposed between a pair of core-supporting rings and between a pair of frame rings, and the fastening-means for the respective ends of said springs comprising inner-frame beams extending axially between said pair of core-supporting rings and outer-frame beams extending axially between said pair of frame-rings, respectively.

3. A horizontal-shaft alternating-current dynamo-electric machine having an outer frame, an inner frame, a stator-core secured in the inner frame, and a plurality of sets of broad flat leaf-springs connected between the inner frame and the outer frame, the flat sides of said springs being substantially tangential to the inner frame at the respective points of attachment thereto, said inner frame comprising a plurality of externally projecting core-supporting rings, and said outer frame comprising a plurality of internally projecting frame-rings, each set of four leaf-springs being disposed between a pair of core-supporting rings and between a pair of frame-rings, and the fastening-means for the respective ends of said springs comprising inner-frame beams extending axially between said pair of core-supporting rings and outer-frame beams extending axially between said pair of frame-rings, respectively, and said machine being of such size and speed that the double-frequency stator-core vibrations are large enough to necessitate spring-mounting of said core.

MICHAEL RASHEVSKY.
RENÉ A. BAUDRY.

REFERENCES CITED

The following references are of record in the file of this patent:

UNITED STATES PATENTS

| Number | Name | Date |
|---|---|---|
| 2,199,141 | Rice | Apr. 30, 1940 |